United States Patent [19]

Steinbrenner et al.

[11] Patent Number: 5,186,153
[45] Date of Patent: Feb. 16, 1993

[54] TANK-VENTING ARRANGEMENT FOR A MOTOR VEHICLE AND METHOD FOR CHECKING THE OPERABILITY THEREOF

[75] Inventors: Ulrich Steinbrenner; Helmut Denz, both of Stuttgart; Ernst Wild, Oberriexingen, all of Fed. Rep. of Germany

[73] Assignee: Robert Bosch GmbH, Stuttgart, Fed. Rep. of Germany

[21] Appl. No.: 777,313

[22] PCT Filed: Mar. 1, 1991

[86] PCT No.: PCT/DE91/00180

§ 371 Date: Dec. 2, 1991

§ 102(e) Date: Dec. 2, 1991

[87] PCT Pub. No.: WO91/15670

PCT Pub. Date: Oct. 17, 1991

[30] Foreign Application Priority Data

Mar. 30, 1990 [DE] Fed. Rep. of Germany ....... 4010171
Aug. 11, 1990 [DE] Fed. Rep. of Germany ....... 4025544

[51] Int. Cl.$^5$ ............................................. F02M 33/02
[52] U.S. Cl. ..................... 123/519; 123/520; 123/198 D
[58] Field of Search ............... 123/516, 518, 519, 520, 123/521, 494, 198 D

[56] References Cited

U.S. PATENT DOCUMENTS

| | | | |
|---|---|---|---|
| 4,683,861 | 8/1987 | Breitkreuz et al. | 123/520 |
| 4,748,959 | 6/1988 | Cook et al. | 123/520 |
| 4,821,701 | 4/1989 | Nankee, II et al. | 123/520 |
| 4,926,825 | 5/1990 | Ohtaka et al. | 123/520 |
| 4,945,885 | 8/1990 | Gonze et al. | 123/520 |
| 4,949,695 | 8/1990 | Uranishi et al. | 123/198 D |
| 4,962,744 | 10/1990 | Uranishi et al. | 123/198 D |
| 5,048,493 | 9/1991 | Orzel et al. | 123/520 |
| 5,072,712 | 12/1991 | Steinbrenner et al. | 123/520 |
| 5,085,197 | 2/1992 | Mader et al. | 123/520 |
| 5,088,466 | 2/1992 | Tada | 123/520 |
| 5,099,439 | 3/1992 | Saito | 123/520 |

FOREIGN PATENT DOCUMENTS

| | | | |
|---|---|---|---|
| 3008320 | 9/1980 | Fed. Rep. of Germany . | |
| 0119956 | 7/1983 | Japan | 123/520 |
| 0128438 | 8/1983 | Japan | 123/520 |

*Primary Examiner*—E. Rollins Cross
*Assistant Examiner*—Thomas N. Moulis
*Attorney, Agent, or Firm*—Walter Ottesen

[57] ABSTRACT

A tank-venting arrangement for a motor vehicle includes a fuel tank KT having a HC (hydrocarbon)-sensor, an adsorption filter AF and a tank-venting valve TEV. If the HC-sensor annouces that fuel vapor above a pregiven concentration is present in the tank, then it is expected that a lambda correction in the lean direction is required when the tank-venting valve is opened. If such a correction is not determined, this shows that either the arrangement leaks or the tank-venting valve does not open correctly. For carrying out the mentioned testing method, this arrangement requires only a single additional sensor, namely, the HC-sensor mounted in the tank. The arrangement is therefore simpler than known arrangements and nonetheless permits carrying out a reliable method for checking the operability.

4 Claims, 2 Drawing Sheets

TANK-VENTING ARRANGEMENT FOR A MOTOR VEHICLE AND METHOD FOR CHECKING THE OPERABILITY THEREOF

FIELD OF THE INVENTION

The invention relates to a tank-venting arrangement for a motor vehicle and a method for checking the operability of such an arrangement.

BACKGROUND OF THE INVENTION

A tank-venting arrangement generally includes a fuel tank and a tank-venting valve which is connected to the air-intake pipe of an internal combustion engine so that fuel vapors can be drawn off with the aid of the underpressure in the intake pipe. Conventionally, the volume in the tank disposed above the fuel is not drawn off directly; instead, an adsorption filter, usually an active charcoal filter, is connected between the tank and the tank-venting valve. This active charcoal filter adsorbs fuel in those time durations in which no suction takes place from the intake pipe, for example, when the internal combustion engine is at standstill or, when, because of the actual operating condition, the tank-venting valve is held closed.

The danger is present that the tank-venting arrangement develops a leak or that the tank-venting valve does not operate properly. For this reason, such arrangements are to be checked repeatedly with respect to operability during the operation of a motor vehicle.

The most important method for checking the operability of a tank-venting arrangement of a motor vehicle is based upon a suggestion of the California Environmental Authority CARB. Pursuant to this method, a check is made while opening the tank-venting valve as to whether a lambda controller must undertake a correction of its output value. This is always the case when air with fuel vapor is drawn by suction from the tank-venting arrangement. However, the adsorption filter can be completely regenerated and the fuel in the tank can be completely degassed. Then, when the tank-venting valve is opened, no fuel in addition to that fuel is supplied which is supplied in accordance with the output value of the lambda control to the injection valves of the internal combustion engine. In such a case, in which no fuel is supplied from the tank-venting arrangement, that is where the lambda controller does not undertake a correction, it is unclear as to whether the tank-venting arrangement leaks or whether no fuel is supplied for the reasons mentioned above. In order to decide this question, an evaluation of the signal from the lambda control is made according to the known method only when a fuel temperature sensor indicates that a pregiven fuel minimum temperature is exceeded and a fuel tank sensor indicates that the motor vehicle was tanked. The premise is taken that fuel vapor must be present in the arrangement in any event which is drawn in by suction when the tank-venting valve is opened and then leads to a correction of the lambda controller. However, erroneous decisions always occur with this method when degassed fuel is disposed in the tank, when such fuel is added with a subsequent tanking and when the adsorption filter is substantially regenerated.

Accordingly, the problem continued to be present to provide a method for checking the operability of a motor vehicle tank-venting arrangement which supplies the least amount of unjustified fault announcements possible. Furthermore, the problem was present to provide a tank-venting arrangement the operability of which could be especially reliably checked.

SUMMARY OF THE INVENTION

The tank-venting arrangement according to the invention for a motor vehicle includes the following parts:

an HC (Hydrocarbon)-sensor for detecting the HC-content of the gas in the fuel tank;

an adsorption filter which is connected to the fuel tank via a filter line; and, a tank-venting valve which connects the adsorption filter to the intake pipe of an internal combustion engine via a venting line.

This arrangement is distinguished from known arrangements by the HC-sensor for the mentioned purpose. With this arrangement, advantages are obtained which are explained further below for a method which includes the following steps:

a determination is made as to whether HC (hydrocarbon) vapor is in the tank and when this is the case, the method continues as follows:

the tank-venting valve is closed for a pregiven time span so that hydrocarbon can accumulate in the adsorption filter; and, after the tank-venting valve is opened, a check is made as to whether a lambda correction in the lean direction is required, and a conclusion is drawn as to the inoperability of the arrangement when a correction of this kind is not required.

For the sake of clarity, it is noted that a check as to whether a lambda correction in the lean direction is required cannot take place in all operating conditions of an internal combustion engine; instead, only in those conditions wherein a pregiven air throughput is not exceeded. This is generally known.

The method according to the invention affords the advantage that a check as to a required lambda correction takes place only when, by a determination of HC-vapor in the fuel tank and the accumulating phase with the tank-venting valve closed, it is established that a correction must be required when the tank-venting valve is again opened provided that the entire arrangement is tight. The tightness of the entire arrangement can be checked because the HC-sensor is mounted in the vapor source, that is in the tank. If the HC-sensor would be mounted at another location, then the extent of the information would become less. In order to make this clear, the assumption is made that the HC-sensor is disposed between the tank-venting valve and the intake pipe. If the tank-venting valve can no longer be opened or the arrangement is not tight, then the sensor never measures HC-vapor and for this reason, a check as to lambda correction in the lean direction never takes place so that it never is determined whether the arrangement is still operable.

The method according to the invention mentioned above for checking the operability of a tank-venting arrangement checks the arrangement as to tightness and the operability of the tank-venting valve. The method according to the invention described below for checking the operability of a tank-venting arrangement with an HC-sensor checks the function of the sensor which, for example, takes place in addition to an electrical check which takes place with minimum and maximum values of a plausibility range of the sensor characteristic. The method includes the following steps:

when the HC-sensor indicates no signal the adsorption filter is flushed to make certain that no HC-vapor can be supplied from this filter which could make a lambda correction in the lean direction necessary;

thereafter, the tank-venting valve is closed for a pregiven time span so that HC-vapor can accumulate in the adsorption filter in the event that such vapor is supplied from the tank even though the HC-sensor indicates no signal; and, after the tank-venting valve is opened, a check is made as to whether a lambda correction in the lean direction is required and the conclusion is drawn as to the inoperability of the sensor when such a correction is required.

From this method sequence, it is clearly seen that the operability of the HC-sensor of the tank-venting valve arrangement according to the invention permits a simple check to be made. This advantage and the advantages mentioned for the other method show that the tank-venting arrangement according to the invention is especially operationally reliable.

DESCRIPTION OF THE PREFERRED EMBODIMENTS OF THE INVENTION

Figure 1:
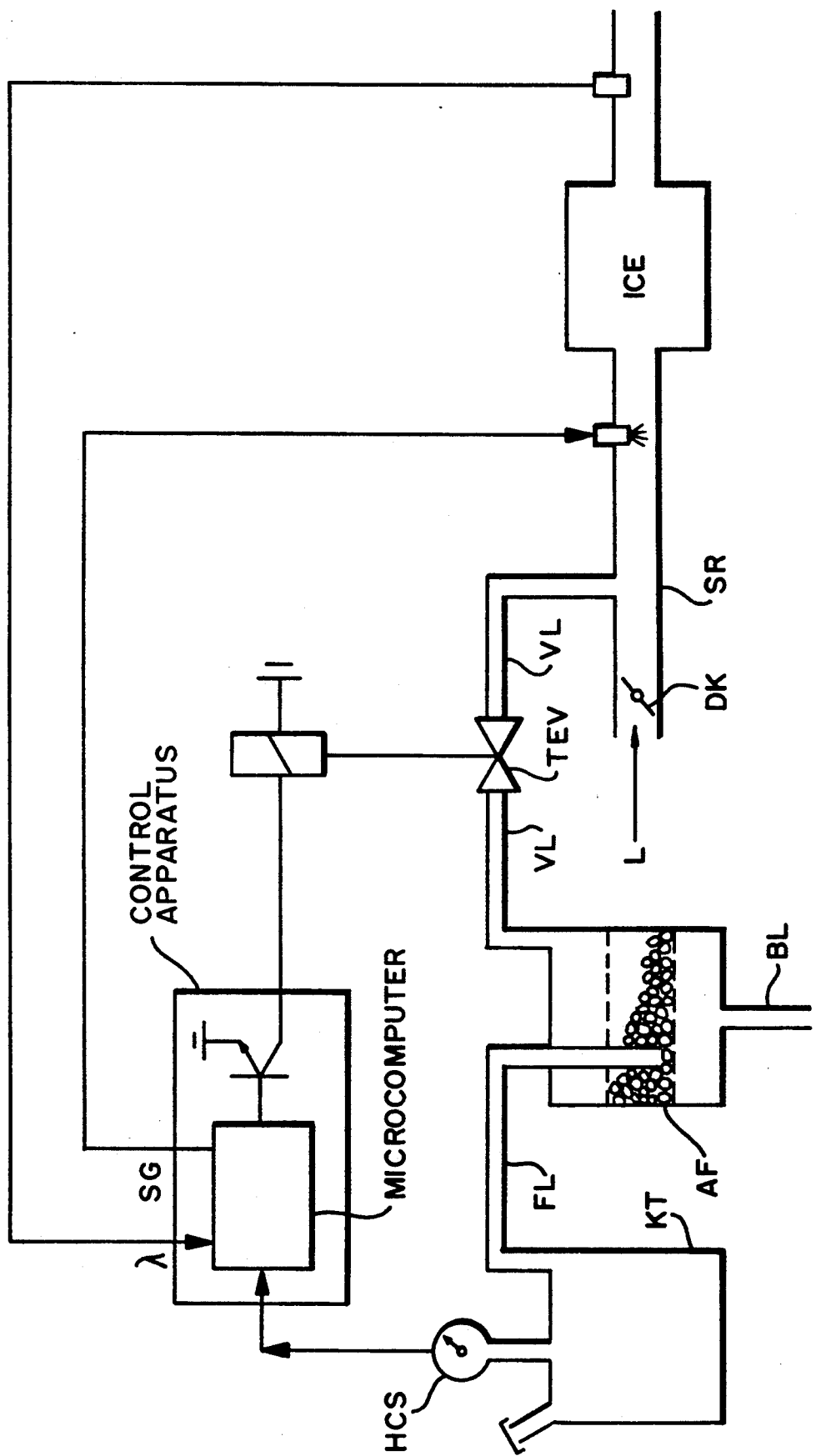
FIG. 1 is a schematic illustration of a tank-venting arrangement having a fuel tank with an HC-sensor.

FIG. 1 shows schematically a tank-venting arrangement with a fuel tank KT, an adsorption filter AF and a tank-venting valve TEV. The tank-venting valve TEV lies in a valve line VL which connects the adsorption filter AF to the intake pipe SR of an internal combustion engine (not shown). The valve line opens behind the throttle flap in the flow direction L of the air drawn in by suction. In this way, it is possible to obtain a relatively high underpressure in the valve line in order to effectively flush the adsorption filter AF with air with the air being drawn in by suction through a venting line BL and which flows through the adsorbing material which, as a rule, is active charcoal. The adsorption filter AF is connected to the fuel tank KT via a filter line FL. If the fuel in the tank becomes vaporous, then the HC-vapor is adsorbed in the adsorption filter AF.

In addition to the known components described until now, the tank-venting arrangement shown in FIG. 1 includes an HC-sensor HCS which is mounted in the fuel tank KT or at the output thereof. The HC-sensor HCS supplies a measurement signal to a microcomputer in a control apparatus SG. This control apparatus emits signals for driving the tank-venting valve TEV. Driving the tank-venting valve is started as a rule with a pregiven pulse duty factor. When an open tank-venting valve is referred to in the following, a condition is understood wherein the tank-venting valve is driven with a pregiven pulse duty factor.

The control apparatus SG receives signals which are required for a lambda control and the apparatus SG supplies output values for the lambda control. The lambda control signals together with signals from the HC-sensor are utilized in such a manner as shown in the following with respect to FIGS. 2 and 3.

Figures 2, 3:
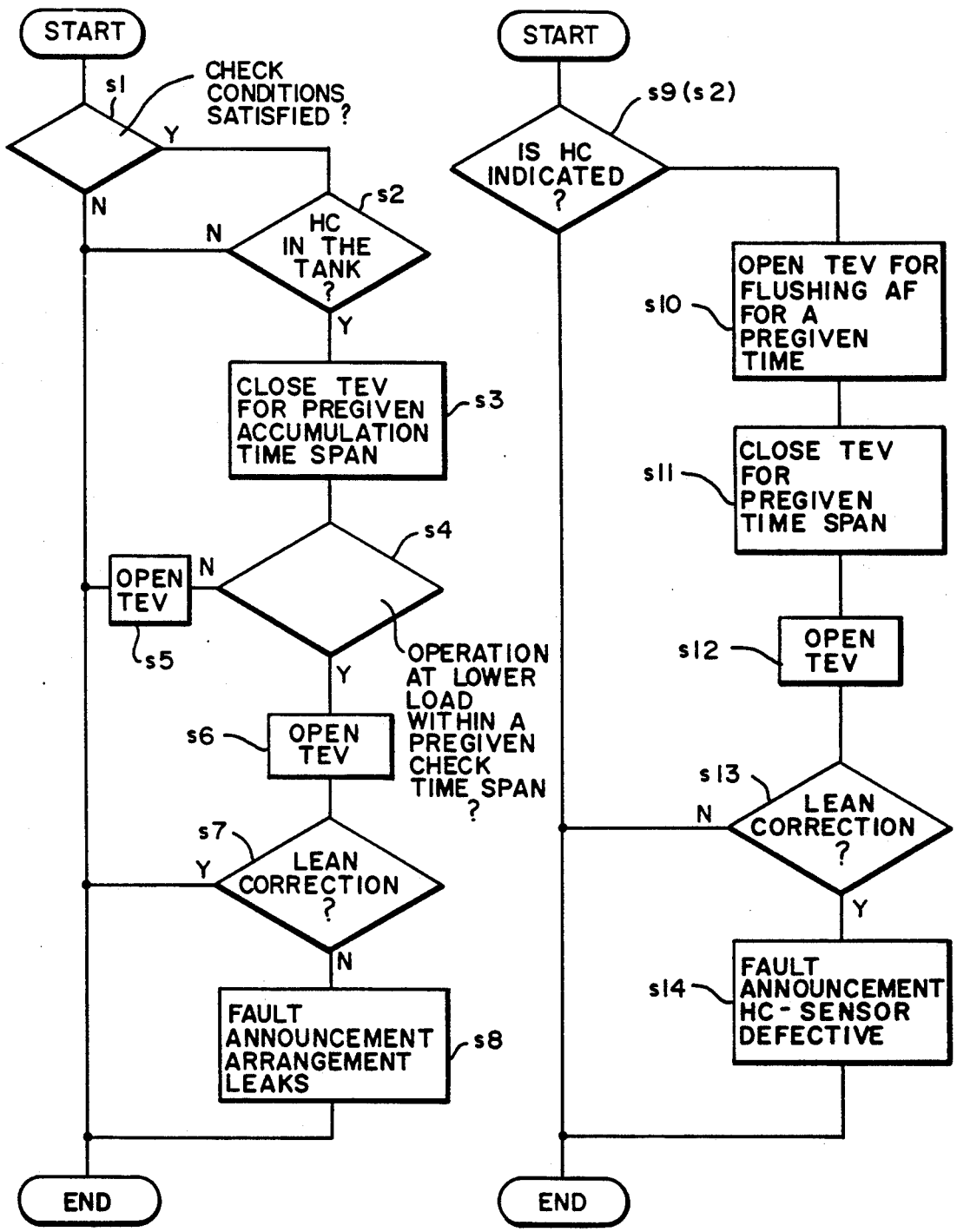
FIG. 2 is a flowchart for explaining a method for checking the tightness of a motor vehicle tank-venting arrangement and the operability of a tank-venting valve in the arrangement; and, FIG. 3 is a flowchart for explaining a method for checking the operability of the HC-sensor in the arrangement according to FIG. 1.

With the method according to FIG. 2 for checking the tightness of the tank-venting arrangement according to FIG. 1 and the operability of the tank-venting valve, an investigation in a step s1 is made as to whether a test condition is satisfied. The test condition can, for example, be the requirement that a pregiven time span has elapsed since a last runthrough of the method. The check condition can also comprise the presence of an operating condition of a load below a pregiven threshold value. If the check condition is not satisfied, then the end of the method is reached immediately. Otherwise, the actual check takes place. For this purpose, a check is made in a step s2 as to whether HC-vapor is disposed in the fuel tank KT. If this is not the case, then the end of the sequence is again reached. However, if HC-vapor is in the tank, then, in a step s3, the tank-venting valve TEV is closed for a pregiven accumulation time span. This ensures that adequate fuel vapor can accumulate in the adsorption filter in order to be able to check in a further step as to whether a lambda correction in the lean direction is required. Such a check is only possible when an operating condition is present having a load below a pregiven load threshold. In a following step s4, an inquiry is made as to the presence of such a condition. If such a condition does not occur within a pregiven check time span, then the tank-venting valve TEV is again opened in a step s5 in order to ensure that the adsorption filter AF is again flushed.

In one embodiment, the accumulation time span according to step s3 and the check time span according to s4 amounted to 30 seconds in each case. These pregiven time spans can however vary within relatively wide limits in dependence upon the overall construction of the arrangement and the type of internal combustion engine which utilizes the arrangement. From these two time spans, a minimum time span of 30 seconds and a maximum time span of 60 seconds result for the closure time of the tank-venting valve. If step s5 follows after 60 seconds because no suitable operating condition occurred for the further check, then flushing takes place for several minutes before step s1 can again switch into the test sequence. An oversaturation of the adsorption filter is avoided in this way.

If the check in step s4 shows that an operating condition is present at the start of the time span or occurs during the time that the time span runs, then starting with the time point of determining the satisfaction of the condition, the tank-venting valve is opened (step s6) and a check is made as to whether a lambda correction in the lean direction lean is required (step s7). Such a correction is expected since HC-vapor, that is fuel vapor was measured in the tank (step s2) and such a vapor was accumulated so that such vapor must be taken into the intake pipe SR (FIG. 1) by suction when the tank-venting valve is opened, assuming that the arrangement is tight and the tank-venting valve actually opens when the valve is driven by a corresponding signal. If the expected case of the lambda correction in the lean direction occurs, step s7 leads to the end of the method. Otherwise, in advance of reaching the end of the method, a fault announcement is emitted in a step s8 which indicates that the arrangement is not tight or that the tank-venting valve is blocked. The fault announcement can be indicated optically and/or acoustically and the fault announcement can be stored for automatic fault diagnosis.

From the sequence just described, it can be seen that the detailed investigations as to operability of the tank-venting arrangement can be carried out only when the HC-sensor HCS announces that HC-vapors are disposed in the tank (step s2). If the HC-sensor is defective, then the sensor cannot supply such an announcement which would have had the consequence that the check just described could never be carried out and therefore it must be continuously assumed without the fault announcement (step s8) that the arrangement is in order. In order to avoid this deficiency, the operability of the HC-sensor is advantageously checked with a method as can be seen in FIG. 3.

In the method shown in FIG. 3, a check is first made in a step s9 as to whether an indication as to HC-vapors in the fuel tank is present. If this is the case, then the end of the method is immediately reached. Otherwise, the actual test sequence follows for determining whether the HC-sensor is operable. It should be noted that the condition checked in step s9 corresponds to that condition as it was checked in step s2 explained above. From the foregoing, it follows that the method according to FIG. 3 can easily be integrated into the method sequence according to FIG. 2. In this case, when the condition of the HC-indication is satisfied, the sequence with the steps s3 to s8 follows; otherwise the sequence follows for the concrete check of the operability of the HC-sensor.

If the check as to an HC-indication (step s9 or step s2) shows that no HC-vapor concentration is present above a pregiven threshold value, then a check is made with steps s10 to s13 as to whether this statement is not caused by the HC-sensor being defective. For this purpose (step s10), first the tank-venting valve TEV is opened for a pregiven time span which is reliably adequate to flush the adsorption filter AS to the extent that the adsorption filter AS does not supply fuel vapor in such a quantity that it would make a lambda correction in the lean direction necessary. This presumes that no fuel vapor is supplied afterward from the tank in correspondence to the indication of the HC-sensor. If the mentioned time span has elapsed, then the tank-venting valve is closed for a pregiven time duration (step s11). If the indication of the HC-sensor is correct that no fuel vapor of a concentration above a threshold value is present in the tank, then no fuel vapor accumulates in the adsorption filter in this time span. However, if the indication is false, that is, if in opposition to the statement of the HC-sensor, fuel vapor is indeed present above a pregiven concentration, an accumulation of the vapor in the adsorption filter takes place. If the tank-venting valve is now opened (step s12) and a check is made as to whether a correction in the lean direction is required (step 13), then two possibilities exist. One possibility is that the HC-sensor has indicated correctly that no accumulation of fuel has occurred and that, accordingly, no lambda correction is required. The end of the method is then reached. However, if a lambda correction in the lean direction is required, this shows that fuel vapor was indeed supplied from the tank even though the HC-sensor showed that no concentration was present which would be adequate to lead to an accumulation that would make a lambda correction in the lean direction necessary in the mentioned sequence. A fault announcement is then supplied (step s14) which indicates that the HC-sensor is defective. This indication can take place optically and/or acoustically and it can be stored for fault diagnosis.

The described arrangement as well as the described methods utilize an HC-sensor in the tank. In the methods, various test conditions and time spans are utilized and examples have been provided therefor. The conditions and values of the time spans can be easily varied as was explained. It is of significance that for the measurements either conditions have to be adjusted for which it can be relied upon that a supply of fuel will come from the tank-venting arrangement or it must be clear that such supply cannot be relied upon for an operable arrangement based upon the signal of the HC-sensor in the tank.

The method according to FIG. 2 utilizes as a sensor only the HC-sensor mounted in the tank which is available in addition to the basic configuration of a tank-venting arrangement. In contrast, the known arrangement described initially includes two additional sensors. Although in the arrangement described above only the HC-sensor is used in lieu of the conventional two sensors, a test method nonetheless can be carried out which permits higher statement reliability with reference to the operability of the arrangement than the known method.

What is claimed is:

1. A method for checking the operability of a motor vehicle tank-venting arrangement having an adsorption filter which connects a fuel tank to the intake pipe of an internal combustion engine via a tank-venting valve, the method comprising the steps of:

determining whether hydrocarbon vapors are present in the tank and, is so, closing the tank-venting valve for a predetermined time period so that the hydrocarbon vapor can accumulate in the absorption filter;

opening the tank-venting valve and checking as to whether a correction of a lambda control in the lean direction is required; and, drawing the conclusion as to the inoperability of the arrangement when a correction of this kind is not required.

2. The method of claim 1, wherein the tank-venting valve remains closed at least for an accumulation time period; after this accumulation time period has elapsed during a subsequent test time period, a check is continuously made as to whether an operating condition of the internal combustion engine with a low air throughput is present, and, as soon as this is the case, the tank-venting valve is opened in order to carry out the mentioned check; otherwise, the tank-venting valve is opened when the test time period has elapsed in order to bring about a flushing of the absorption filter.

3. The method of claim 1, wherein after each accumulation time period, a time period follows for adequate regeneration of the absorption filter.

4. A method for checking the operability of an HC-sensor which is mounted so that the HC-content of the vapor in the tank of a motor vehicle tank-venting arrangement is detected wherein the fuel tank is connected to the intake pipe of an internal combustion engine via an adsorption filter and a tank-venting valve, the method comprising the steps of:

flusing the adsorption filter when the HC-sensor indicates that no hydrocarbon vapor is present above a threshold concentration;

thereafter, closing the tank-venting valve for a predetermined time period;

opening the tank-venting valve and checking as to whether a lambda correction in the lean direction is required; and, drawing a conclusion that the sensor is inoperable when such a lean correction is required.

* * * * *

UNITED STATES PATENT AND TRADEMARK OFFICE
CERTIFICATE OF CORRECTION

PATENT NO. : 5,186,153
DATED : February 16, 1993
INVENTOR(S) : Ulrich Steinbrenner, Helmut Denz and Ernst Wild It is certified that error appears in the above-identified patent and that said Letters Patent is hereby corrected as shown below:

In the title page, in the Abstract, line 4: delete "annouces" and substitute -- announces -- therefor.

In column 4, line 52: delete "lean" (second occurrence).

In column 6, line 28: delete "is" and substitute -- if -- therefor.

In column 6, line 48: delete "absorption" and substitute -- adsorption -- therefor.

In column 6, line 51: delete "absorption" and substitute -- adsorption -- therefor.

In column 6, line 59: delete "flusing" and substitute -- flushing -- therefor.

Signed and Sealed this

Sixteenth Day of November, 1993

Attest:

BRUCE LEHMAN

*Attesting Officer*   *Commissioner of Patents and Trademarks*